United States Patent
Natsumeda et al.

(10) Patent No.: US 11,438,680 B2
(45) Date of Patent: Sep. 6, 2022

(54) TRANSDUCER FOR CONVERTING BETWEEN ELECTRICAL ENERGY AND MECHANICAL ENERGY

(71) Applicant: Murata Manufacturing Co., Ltd., Nagaokakyo (JP)

(72) Inventors: Mitsutoshi Natsumeda, Nagaokakyo (JP); Eiji Sakaguchi, Nagaokakyo (JP); Hisato Amano, Nagaokakyo (JP); Takashi Sakurada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 305 days.

(21) Appl. No.: 16/800,296

(22) Filed: Feb. 25, 2020

(65) Prior Publication Data
US 2020/0280775 A1    Sep. 3, 2020

(30) Foreign Application Priority Data

Feb. 28, 2019  (JP) .............................. JP2019-036200
Dec. 6, 2019   (JP) .............................. JP2019-221130

(51) Int. Cl.
*H04R 1/02*    (2006.01)
*H02K 11/33*   (2016.01)

(52) U.S. Cl.
CPC .............. *H04R 1/021* (2013.01); *H02K 11/33* (2016.01); *H02K 2203/09* (2013.01)

(58) Field of Classification Search
CPC ........................... H02K 2203/09; H04R 1/021
See application file for complete search history.

(56) References Cited

U.S. PATENT DOCUMENTS

| | | | |
|---|---|---|---|
| 10,998,789 B2* | 5/2021 | Tategata | H02K 3/50 |
| 2003/0173841 A1* | 9/2003 | Kobayashi | H02K 15/0056 310/71 |
| 2015/0333590 A1 | 11/2015 | Yoshida et al. | |
| 2015/0381002 A1* | 12/2015 | Hashimoto | H02K 15/0056 310/71 |

(Continued)

FOREIGN PATENT DOCUMENTS

DE   102016123479 A1   6/2018
JP     2002153003 A    5/2002

(Continued)

OTHER PUBLICATIONS

Chinese Office Action issued for CN Application No. 202010119630.6, dated Dec. 16, 2021.

*Primary Examiner* — Robert W Horn
(74) *Attorney, Agent, or Firm* — ArentFox Schiff LLP

(57) ABSTRACT

A motor that includes a plurality of stator members and a busbar member. The busbar member connects to coil end portions of a predetermined stator member of the plurality of stator members. The busbar member may comprise a first busbar, a second busbar, and a third busbar. The busbars may include an annular-shaped base portion, and a connection terminal connected to an outer circumference of the base portion and connected to the coil end portions. The busbar member and the plurality of stator members may be aligned in an axial direction. Each connection terminal of the busbars may have a shape projecting toward the stator member relative to the base portion.

17 Claims, 10 Drawing Sheets

(56) References Cited

U.S. PATENT DOCUMENTS

| | | | |
|---|---|---|---|
| 2016/0013691 A1* | 1/2016 | Houzumi | H02K 3/04 |
| | | | 310/208 |
| 2016/0036187 A1* | 2/2016 | Houzumi | H02K 3/522 |
| | | | 264/255 |
| 2019/0006905 A1* | 1/2019 | Lindwurm | H02K 3/38 |
| 2019/0157934 A1* | 5/2019 | Kawaguchi | H02K 3/522 |
| 2020/0028400 A1* | 1/2020 | Seo | H02K 15/10 |
| 2020/0106319 A1 | 4/2020 | Tategata et al. | |
| 2020/0195078 A1* | 6/2020 | Shiraki | H02K 3/47 |
| 2020/0220413 A1* | 7/2020 | Burmeister | H02K 3/50 |
| 2021/0194309 A1* | 6/2021 | Okamura | H02K 15/14 |
| 2021/0305872 A1* | 9/2021 | Mueller | H02K 3/522 |
| 2021/0320545 A1* | 10/2021 | Shimodaira | H02K 1/146 |

FOREIGN PATENT DOCUMENTS

| | | |
|---|---|---|
| JP | 2016013053 A | 1/2016 |
| WO | 2014122762 A1 | 8/2014 |

* cited by examiner

TRANSDUCER FOR CONVERTING BETWEEN ELECTRICAL ENERGY AND MECHANICAL ENERGY

CROSS REFERENCE TO RELATED APPLICATIONS

This application claims priority to Japanese Patent Application No. 2019-036200, filed Feb. 28, 2019, and Japanese Patent Application No. 2019-221130, filed Dec. 6, 2019, the entire contents of each of which are hereby incorporated in their entirety.

TECHNICAL FIELD

Aspects of the present disclosure are directed to a transducer for converting between electrical energy and mechanical energy, for example, a motor configured to generate a rotational force by controlling the phase of a current flowing through a coil that is wound around a stator.

BACKGROUND OF THE INVENTION

Japanese Unexamined Patent Application Publication No. 2016-13053 discloses a motor. The motor disclosed in the Japanese Unexamined Patent Application Publication No. 2016-13053 includes a stator core and a busbar. The stator core is made of a plurality of teeth, where a winding wire is wound around each tooth. The plurality of teeth are arranged at equal intervals in a circumferential direction.

The busbar is located near the stator core in an axial direction of the motor. The busbar includes an annular-shaped base portion and a connection portion connected to the base portion. The connection portion projects, with respect to the base portion, from the opposite side to the side where the stator core is disposed. The connection portion sandwiches the winding wire of each of the teeth, and the winding wire of each of the teeth and the busbar are connected to each other.

The overall size in an axial direction of the motor disclosed in Japanese Unexamined Patent Application Publication No. 2016-13053 is simply measured by adding the size of the stator and the size of the busbar. However, the size of the busbar does not contribute to the output efficiency of the motor. Thus, the output efficiency compared to the overall size of the motor is decreased.

SUMMARY OF THE INVENTION

Accordingly, it is an object of the present invention to provide a transducer for converting between electrical energy and mechanical energy having a smaller shape without decreasing the output.

A transducer for converting between electrical energy and mechanical energy according to an aspect of the disclosure of the present invention includes a stator and a busbar. In the stator, a coil is wound. The busbar may be connected to an end portion of the coil. The busbar may include a base portion formed in an annular shape, and a connection terminal connected to an outer circumference of the base portion and connected to the coil end portion. The busbar and the stator may be aligned in an axial direction. The connection terminal may comprise a portion with a shape which projects toward the stator relative to the base portion.

In this configuration, the busbar may be connected to the coil of the stator by the connection terminal projecting toward the stator side. With this, the size in the axial direction of the structure including the busbar and the stator becomes reduced.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a preferred mode of use, further features and advances thereof, will be understood by reference to the following detailed description of illustrative implementations of the disclosure when read in conjunction with reference to the accompanying drawings, wherein.

DETAILED DESCRIPTION

Figure 1:
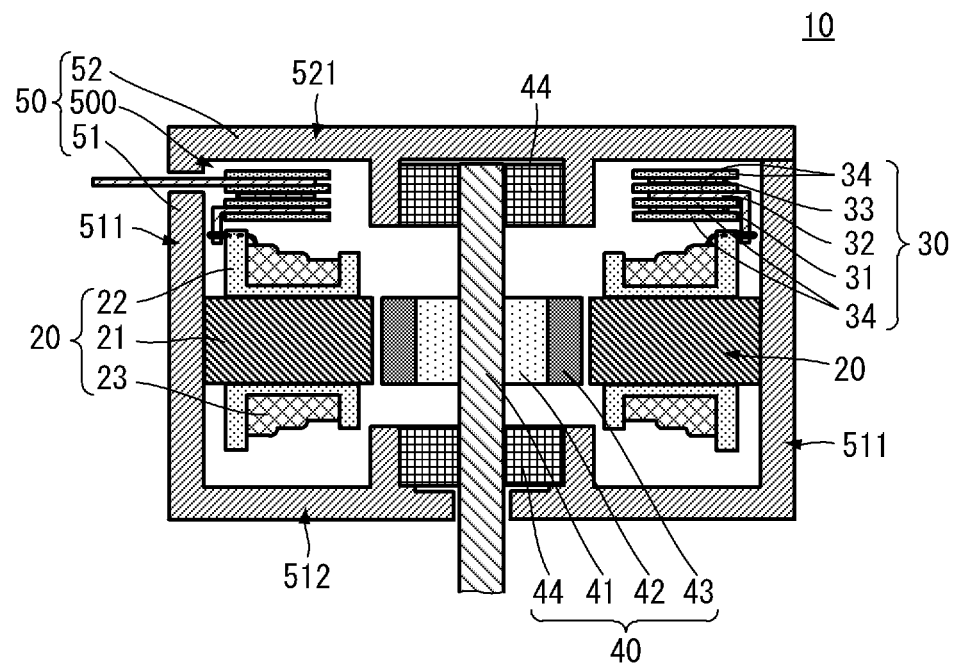
FIG. 1 is a cross-sectional view illustrating a schematic configuration of a motor in accordance with aspects of the present disclosure.
Figure 2:
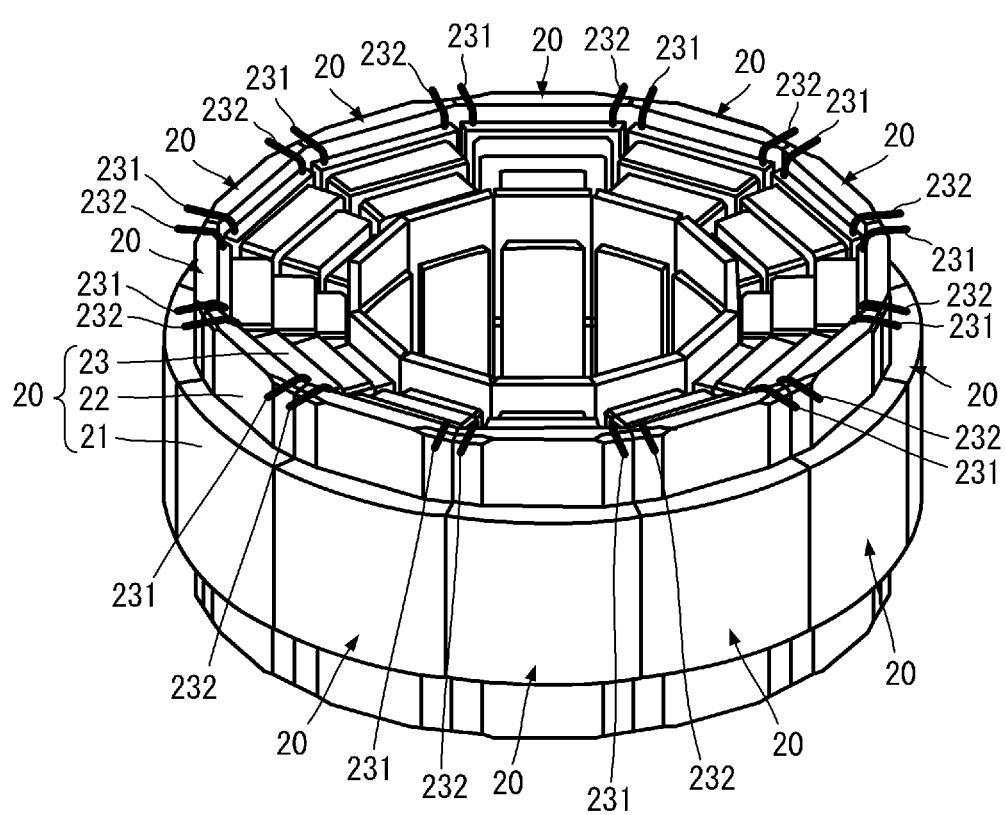
FIG. 2 is a perspective view illustrating an arrangement of a plurality of stator members in accordance with aspects of the present disclosure.
Figure 3A:
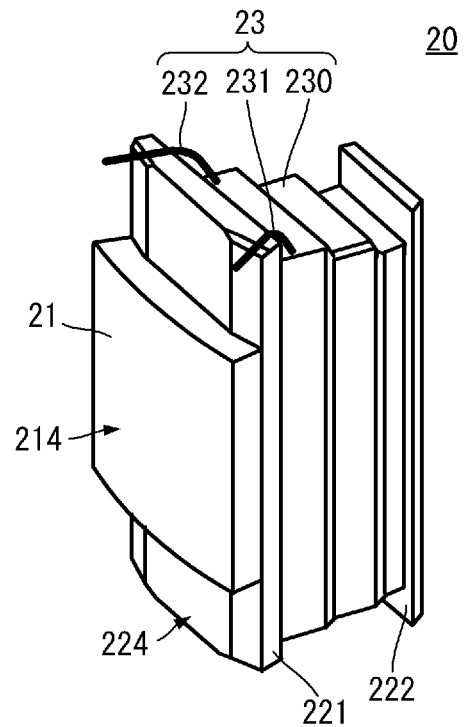
FIG. 3A is a perspective view of a stator member in accordance with aspects of the present disclosure.
Figure 3B:
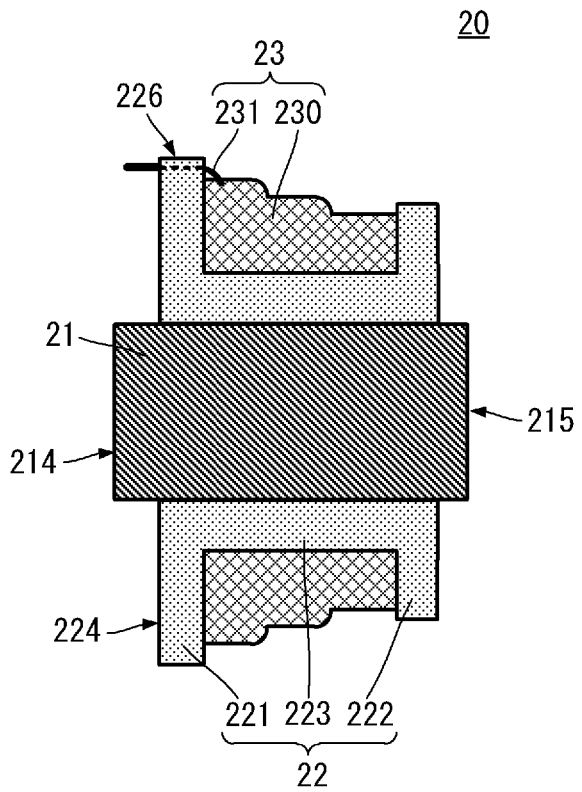
FIG. 3B is a cross-sectional view illustrating a schematic configuration of a stator member in accordance with aspects of the present disclosure.

A motor according to an aspect of the disclosure of the present invention will be described with reference to the drawings. FIG. 1 is a cross-sectional view illustrating a schematic configuration of a motor according to an aspect of the disclosure. FIG. 2 is a perspective view illustrating an arrangement of a plurality of stator members. FIG. 3A is a perspective view of a stator member, and FIG. 3B is a cross-sectional view illustrating a schematic configuration of a stator member. Although a motor is described as a transducer for converting between electrical energy and mechanical energy in one aspect of the disclosure, a generator may also be taken as the transducer. That is, the transducer for converting between electrical energy and mechanical energy may be any type of transducer that converts from electrical energy to mechanical energy and any type of transducer that converts from mechanical energy to electrical energy.

As illustrated in FIG. 1, a motor 10 includes stator members 20, a busbar member 30, a rotor member 40, and a housing 50. A plurality of stator members 20 (also referred to interchangeably herein as a "stator") are illustrated, yet any number of stator members may be implemented.

The housing 50 may include a first member 51 and a second member 52. The first member 51 has a cylindrical first wall 511 and a flat-plate second wall 512 sealing one end of the cylindrical shape. The first member 51 is formed in a substantially cylindrical box shape having an opening. The second member 52 is formed in a substantially plate-like shape. The second member 52 includes a flat-plate third wall 521. The second member 52 is disposed as to seal the opening of the first member 51. Thus, the housing 50 has a space 500 substantially blocked from an outside area via a combination of the first wall 511, the second wall 512, and the third wall 521. The material of the first member 51 and the second member 52 may be of a high rigidity.

The stator members 20, the busbar member 30, and the rotor member 40 may be disposed in the space 500 formed by the housing 50. The rotor member 40 may be disposed substantially at the center in plan view of the third wall 521 and the second wall 512. For example, the rotor member 40 may disposed in a central region of a predetermined size including a center axis of the substantially cylindrical shape formed by the first wall 511. In this case, an axial direction of the rotor member 40 may coincides, or parallel, with the axial direction of a substantially cylindrical shape formed by the plurality of stator members 20.

As illustrated in FIG. 1, the plurality of stator members 20 may be disposed between the cylindrical first wall 511 of the housing 50 and the rotor member 40. In this case, as illustrated in FIG. 2, the plurality of stator members 20 may be disposed at equal intervals along a circumferential direction of the cylindrical shape. The plurality of stator members 20 may be disposed close to one another.

As illustrated in FIG. 1, the busbar member 30 may be disposed close to the plurality of stator members 20 in the axial direction of the housing 50. The busbar member 30 may be connected to the stator member 20 by a connection pattern, as described below. The busbar member 30 may be provided with a busbar output terminal. Part of the busbar output terminal may be exposed to the outside of the housing 50.

The rotor member 40 may include a shaft 41, a rotor yoke 42, a magnet 43, and a bearing 44. The shaft 41 may be rod-shaped and may be constructed with a high rigidity. The direction in which an axis of the shaft 41 extends (also referred to interchangeably herein as a "axial direction") coincides with an axis of the annular shape formed by the plurality of stator members 20. The shaft 41 may be installed in the housing 50 via the bearing 44. The rotor yoke 42 may be disposed on an outer principal surface of the shaft 41. The magnet 43 may be disposed on an outer principal surface of the rotor yoke 42.

The stator member 20 includes a stator core 21, an insulator 22, and a coil 23. As illustrated in FIGS. 3A and 3B, the stator core 21 is made of a magnetic material, and has a substantially columnar shape. The stator core 21 includes an outer end surface 214 and an inner end surface 215. The inner end surface 215 of the stator core 21 opposes the magnet 43.

The insulator 22 is electrically insulative and may include an outer member 221, an inner member 222, and a central member 223. The central member 223 has a substantially cylindrical shape. The outer member 221 may be connected to one end in an extending direction of the central member 223. The inner member 222 may be connected to the other end in the extending direction of the central member 223. In one aspect of the disclosure, when viewed in the axial direction of the central member 223, an area of the outer member 221 and the inner member 222 may be larger than an area of the outer shape of the central member 223. The insulator 22 is divided into two members comprising an upper member and a lower member (not labeled), and covers the stator core 21 by the upper member and the lower member. Thus, the central member 223 of the upper member and the central member 223 of the lower member may have a substantially semicircular cross section.

The central member 223 covers substantially the entirety of the outer principal surface of a central portion of the stator core 21. The outer member 221 may be disposed near an outer end portion of the stator core 21, and the inner member 222 may be disposed near an inner end portion of the stator core 21. With this configuration, the outer end surface 214 of the stator core 21 is not covered with the insulator 22, and the inner end surface 215 of the stator core 21 is not covered with the insulator 22.

The coil 23 may be made of a linear conductor. The coil 23 may include a main conductor 230, a coil end portion 231, and a coil end portion 232. The coil end portion 231 is one end of the main conductor 230, and the coil end portion 232 is another end of the main conductor 230. The coil end portion 231 and the coil end portion 232 may also be referred to interchangeably herein as a "coil end portion."

The main conductor 230 may be covered with an insulative film. Neither the coil end portion 231 nor the coil end portion 232 are covered with the insulative film. The main conductor 230 may be wound around the central member 223 of the insulator 22. In one aspect of the disclosure, the main conductor 230 may be disposed within a region surrounded by an outer circumferential surface of the central member 223 in the insulator 22, a wall surface of the outer member 221 being on a side connecting to the central member 223 and not overlapping with the central member 223, and a wall surface of the inner member 222 on a side connecting to the central member 223 and not overlapping with the central member 223.

The coil end portion 231 and the coil end portion 232 are guided to an outside area from the outer member 221 side of the insulator 22. In one aspect of the disclosure, the coil end portion 231 and the coil end portion 232 may be guided to the side of one surface 226 of the outer member 221. The coil end portion 231 may be guided to one end of the surface 226 in the outer member 221, and the coil end portion 232 is guided to another end of the surface 226 in the outer member 221. The "one end" and the "other end" in the disclosure refers to the ends in a width direction of the stator member 20, and refer to the ends in a direction in which the plurality of stator members 20 are aligned. With this configuration, as illustrated in FIG. 2, in the stator members 20 adjacent to each other, the coil end portion 231 of one stator member 20 and the coil end portion 232 of another stator member 20 are close to each other.

Figure 4:
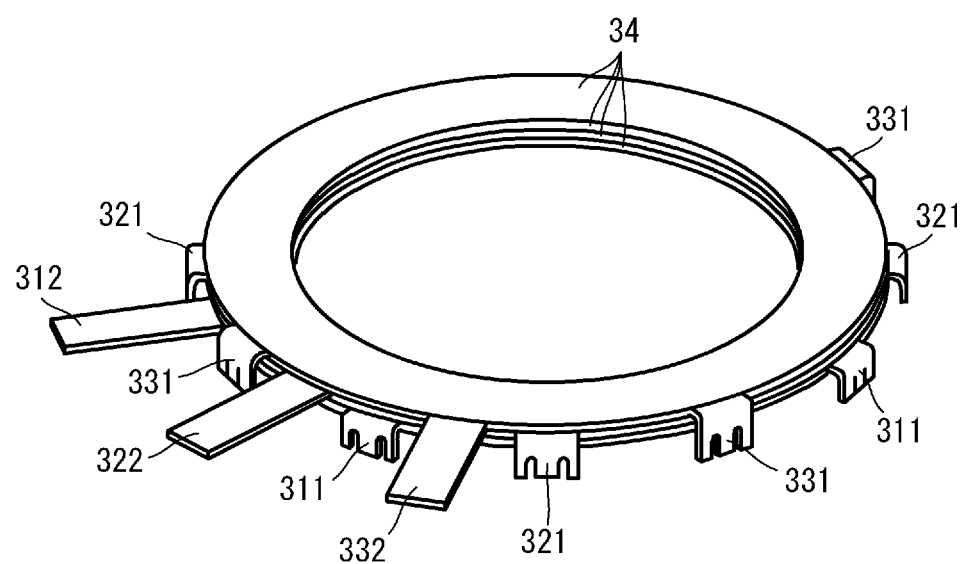
FIG. 4 is an external perspective view of a busbar member in accordance with aspects of the present disclosure.
Figure 5:
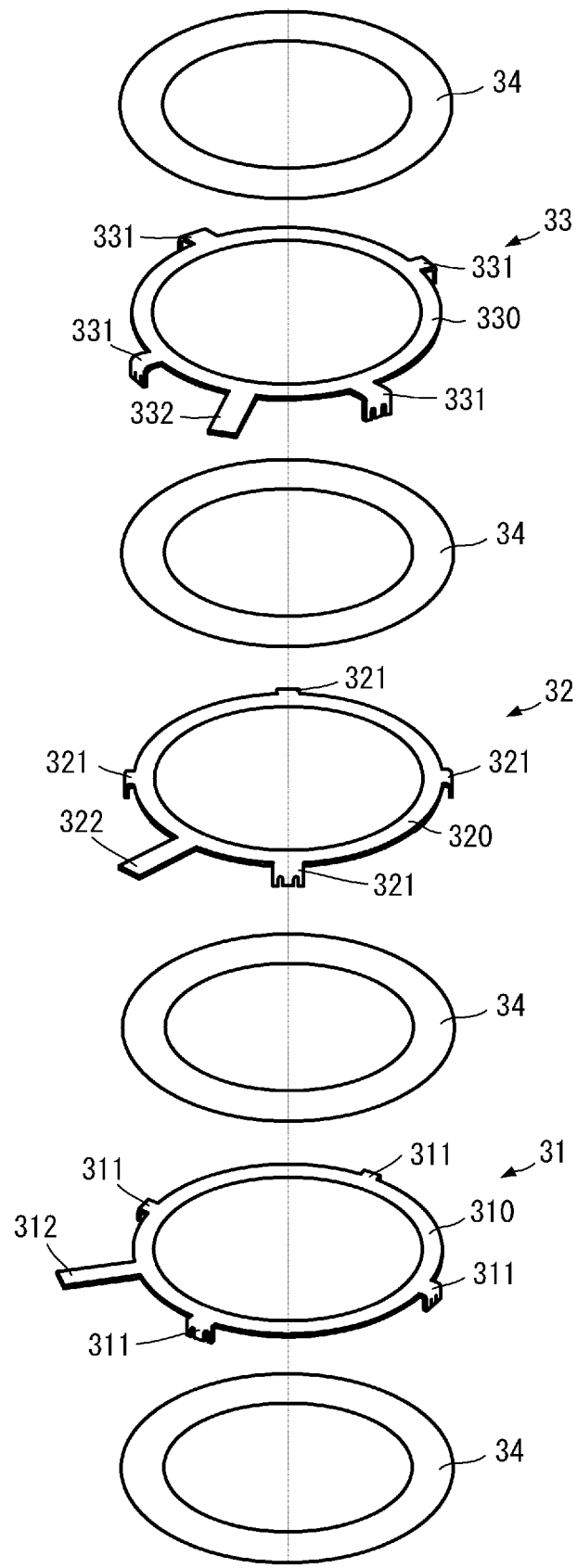
FIG. 5 is an exploded perspective view of a busbar member in accordance with aspects of the present disclosure.
Figure 6A:
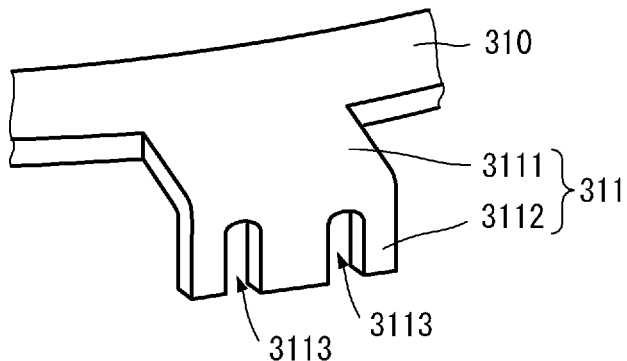
FIG. 6A is an enlarged perspective view of a busbar terminal in accordance with aspects of the present disclosure.
Figure 6B:
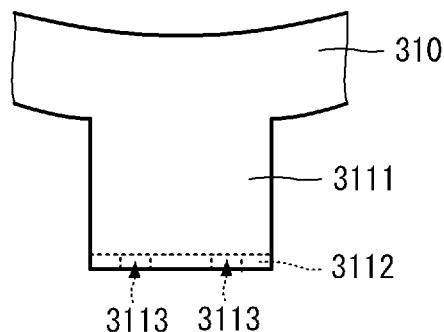
FIG. 6B is an enlarged plan view of a busbar terminal in accordance with aspects of the present disclosure.
Figure 6C:
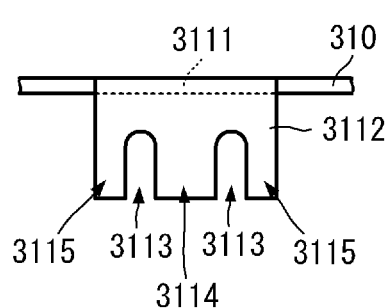
FIG. 6C is a first side view in which a busbar terminal is enlarged and depicted in accordance with aspects of the present disclosure.
Figure 6D:
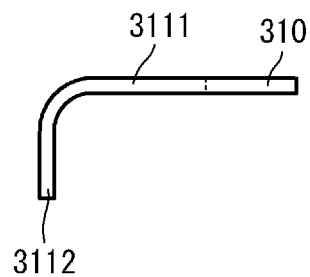
FIG. 6D is a second side view in which a busbar terminal is enlarged and depicted in accordance with aspects of the present disclosure.

FIG. 4 is an external perspective view of the busbar member according to an aspect of the disclosure. FIG. 5 is an exploded perspective view of the busbar member according to an aspect of the disclosure. FIG. 6A is an enlarged perspective view of a busbar terminal according to as aspect of the disclosure. FIG. 6B is an enlarged plan view of the busbar terminal. FIG. 6C is a first side view in which the busbar terminal is enlarged and depicted, and FIG. 6D is a second side view in which the busbar terminal is enlarged and depicted.

As illustrated in FIGS. 4 and 5, the busbar member 30 includes a busbar 31, a busbar 32, a busbar 33, and a plurality of insulating layers 34. The busbar 31, the busbar 32, and the busbar 33 are plate-shaped and electrically conductive. The busbar 31, the busbar 32, and the busbar 33 may also be linear. According to one aspect of the disclosure, by implementing a thin busbar 31, busbar 32, and busbar 33, may allow for a large flow of current therethrough.

The busbar 31, the busbar 32, the busbar 33, and the plurality of insulating layers 34 may be laminated. For example, the order of the layers may be an insulating layer 34, a busbar 31, an insulating layer 34, a busbar 32, an insulating layer 34, a busbar 33, and an insulating layer 34. In one aspect of the disclosure, it may be possible to omit the insulating layers 34 located at both ends in the lamination direction as long as the insulative property is secured with respect to the housing 50 or the like.

The busbar 31 includes a base portion 310, a plurality of connection terminals 311, and an output terminal 312. The base portion 310 may be formed in an annular shape. The plurality of connection terminals 311 are arranged at equal intervals along the circumferential direction of the base portion 310. For example, as illustrated in FIGS. 4 and 5, the plurality of connection terminals 311 are arranged at an angular interval of approximately 90° along the circumferential direction. The plurality of connection terminals 311 are each formed in a shape projecting outward from the outer circumference of the base portion 310. The plurality of connection terminals 311 may have a width along the circumferential direction of the base portion 310. This width may correspond to a distance between the adjacent coil end portions 231 and 232 of the adjacent stator members 20, as described above. The output terminal 312 may be formed in a shape projecting outward from the outer circumference of the base portion 310. The output terminal 312 connects to a position different from the connection positions of the plurality of connection terminals 311 in the circumferential direction of the base portion 310.

The plurality of connection terminals 311 may be bent halfway in the lengthwise direction orthogonal to the width direction. In one aspect of the disclosure, as illustrated in FIGS. 6A, 6B, 6C, and 6D, the plurality of connection terminals 311 each include a first portion 3111 and a second portion 3112. The first portion 3111 is connected to the base portion 310. An end portion of the first portion 3111 on the opposite side to the connection end portion thereof to the base portion 310, is connected to the second portion 3112.

The first portion 3111 is substantially flush with the base portion 310. In one aspect of the disclosure, a main surface of the base portion 310 and a main surface of the first portion 3111 are connected to each other on the same plane. The second portion 3112 is orthogonal to the first portion 3111. For example, a main surface of the second portion 3112 and the main surface of the first portion 3111 are substantially orthogonal to each other.

Bending directions of the plurality of connection terminals 311 are the same. For example, the second portions 3112 of the plurality of connection terminals 311 project in the same direction with respect to the base portion 310.

Two recesses 3113 may be formed in the second portion 3112 of the connection terminal 311. The two recesses 3113 are formed in a shape that is recessed from an end portion of the second portion 3112 toward the first portion 3111 side. For example, the end portion of the second portion 3112 is positioned on the opposite side to an end portion thereof connected to the first portion 3111. The width of the two recesses 3113 may be greater than or equal to the diameter of the coil end portion 231 and the coil end portion 232.

The two recesses 3113 may be formed being spaced from each other in a width direction of the second portion 3112.

The busbar 32 may include a base portion 320, a plurality of connection terminals 321, and an output terminal 322. The busbar 32 has the same structure as that of the busbar 31. Specifically, the base portion 320 of the busbar 32 is the same as the base portion 310 of the busbar 31. The plurality of connection terminals 321 of the busbar 32 are the same as the plurality of connection terminals 311 of the busbar 31. In one aspect of the disclosure, however, a portion, extending in a direction orthogonal to the base portion 320, of each of the plurality of connection terminals 321 is longer than a portion, extending in a direction orthogonal to the base portion 310, of each of the plurality of connection terminals 311. The output terminal 322 of the busbar 32 is the same as the output terminal 312 of the busbar 31.

The busbar 33 may include a base portion 330, a plurality of connection terminals 331, and an output terminal 332. The busbar 33 has the same structure as that of the busbar 31. Specifically, the base portion 330 of the busbar 33 is the same as the base portion 310 of the busbar 31. The plurality of connection terminals 331 of the busbar 33 are the same as the plurality of connection terminals 311 of the busbar 31. In one aspect of the disclosure, however, a portion, extending in a direction orthogonal to the base portion 330, of each of the plurality of connection terminals 331 is longer than the portion, extending in the direction orthogonal to the base portion 310, of each of the plurality of connection terminals 311, and longer than the portion, extending in the direction orthogonal to the base portion 320, of each of the plurality of connection terminals 321. The output terminal 332 of the busbar 33 is the same as the output terminal 312 of the busbar 31.

The base portion 310 of the busbar 31, the base portion 320 of the busbar 32, and the base portion 330 of the busbar 33 overlap one another when viewed in the lamination direction.

The connection terminals of the busbar 31, the busbar 32, and the busbar 33 do not overlap one another. More specifically, the connection terminals 311 of the busbar 31, the connection terminals 321 of the busbar 32, and the connection terminals 331 of the busbar 33 may be arranged at equal intervals in the circumferential direction of the annulus where the base portion 310, the base portion 320, and the base portion 330 overlap one another. in one aspect of the disclosure, the connection terminal 311, the connection terminal 321 of the busbar 32, and the connection terminal 331 of the busbar 33 are arranged in sequence along the circumferential direction.

The insulating layer 34 has an annular shape. The insulating layer 34 may be made of an insulating paper. The insulating layer 34 is thinner than the busbar 31, the busbar 32, and the busbar 33. The insulating layers 34 are disposed, at least, between the base portion 310 of the busbar 31 and the base portion 320 of the busbar 32, and between the base portion 320 of the busbar 32 and the base portion 330 of the busbar 33. The insulating layers 34 may provide the busbar member 30 with insulative properties among the busbar 31, the busbar 32, and the busbar 33.

In FIGS. 4 and 5, the base portion 310, the base portion 320, and the base portion 330 are annular-shaped, but are not limited to annular shapes. In one aspect of the disclosure, although the structure in FIGS. 4 and 5 illustrates no cut in the base portion 310, the base portion 320, and the base portion 330 in the circumferential direction, there may be a cut therein.

Figure 7:
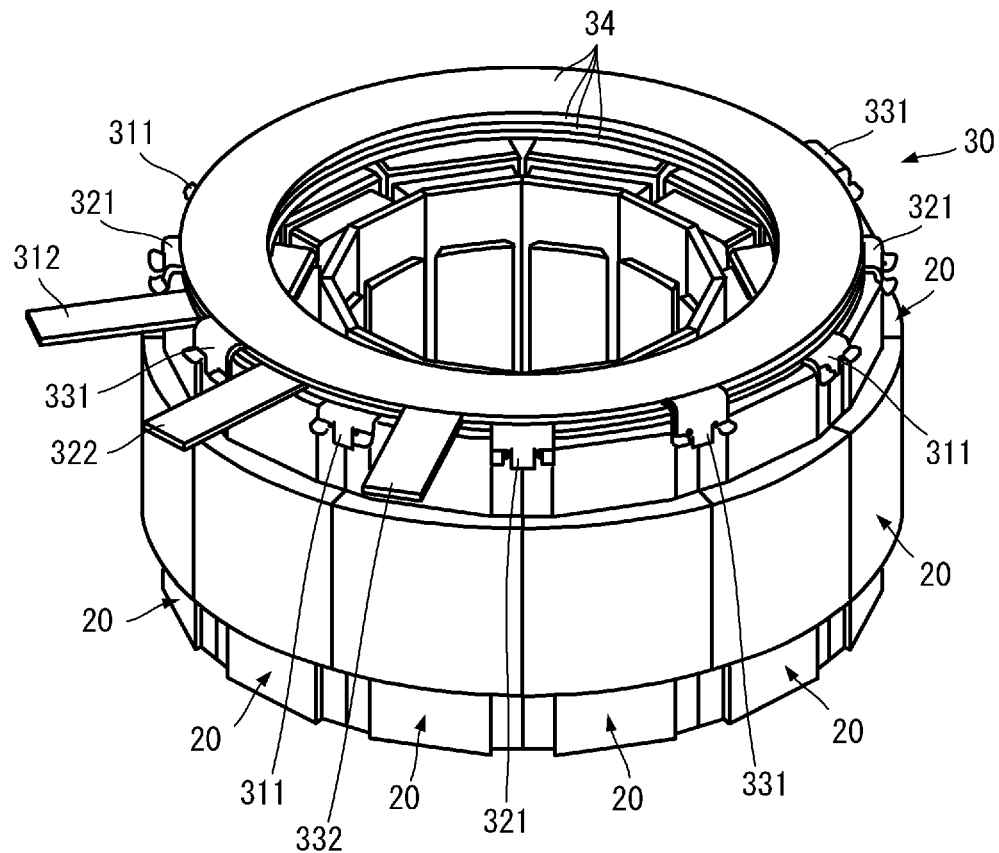
FIG. 7 is a perspective view illustrating a positional relationship between a plurality of stator members and a busbar member in accordance with aspects of the present disclosure.
Figure 8:
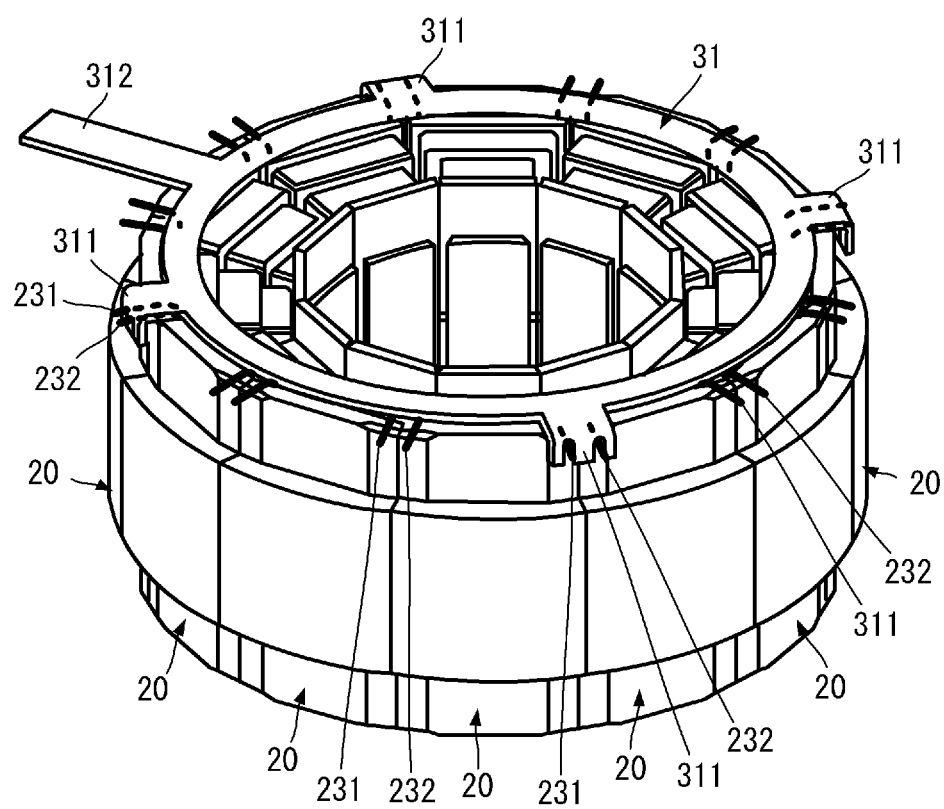
FIG. 8 is a perspective view illustrating a positional relationship between a plurality of stator members and one busbar in accordance with aspects of the present disclosure.
Figure 9:
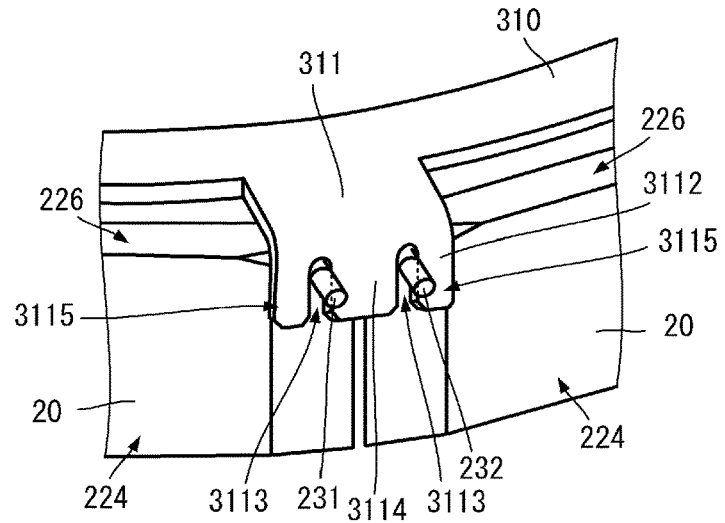
FIG. 9 is an enlarged view illustrating a positional relationship between stator members and one busbar in accordance with aspects of the present disclosure.

FIG. 7 is a perspective view illustrating a positional relationship between the plurality of stator members and the busbar member according to as aspect of the disclosure. FIG. 8 is a perspective view illustrating a positional relationship between the plurality of stator members and one busbar according to as aspect of the disclosure. FIG. 9 is an enlarged view illustrating a positional relationship between the stator members and one busbar according to as aspect of the disclosure.

As illustrated in FIGS. 7 and 8, the busbar member 30 is disposed with respect to the plurality of stator members 20 such that the second portion 3112 of the connection terminal 311, the second portion of the connection terminal 321, and the second portion of the connection terminal 331 are located on the side of the stator member 20. In one aspect of the disclosure, the connection terminal 311, the connection terminal 321, and the connection terminal 331 are each disposed in such a manner as to overlap an opposing portion of the adjacent stator members 20. Further, the coil end portion 231 and the coil end portion 232 of the adjacent stator members 20 may be inserted through two recesses 3113 of any of the connection terminal 311, the connection terminal 321, and the connection terminal 331. For example, as illustrated in FIG. 9, the coil end portion 231 and the coil end portion 232 of the adjacent stator members 20 are inserted through the two recesses 3113 of the connection terminal 311.

Figure 10A:
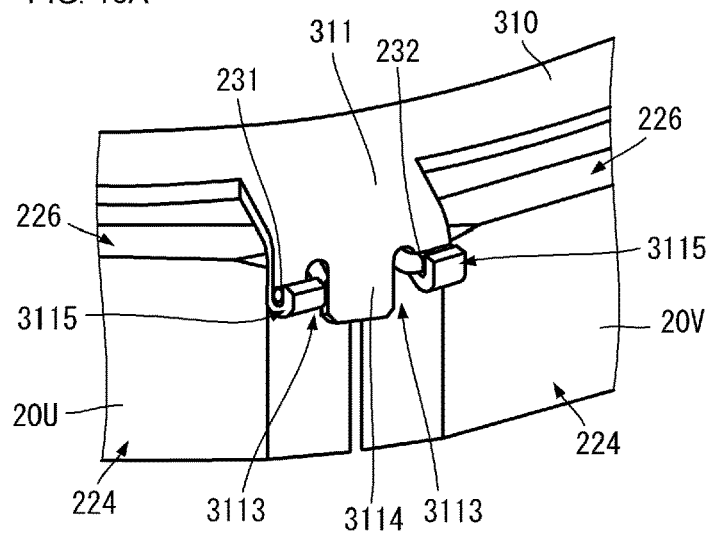
FIG. 10A is and enlarged view illustrating a connection aspect between a coil end portion and a connection terminal in accordance with aspects of the present disclosure.
Figure 10B:
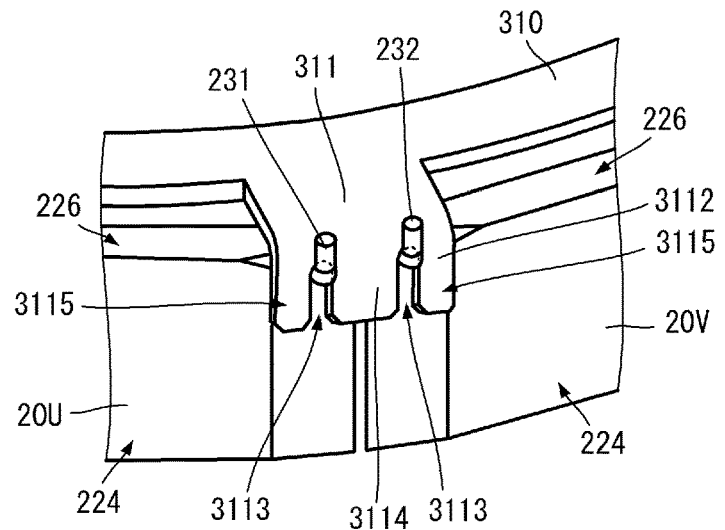
FIG. 10B is an enlarged view illustrating a connection aspect between a coil end portion and a connection terminal in accordance with aspects of the present disclosure.

FIGS. 10A and 10B are enlarged views each illustrating a connection between a coil end portion and a connection terminal. FIG. 10A illustrates an enlarged view of the connection aspect illustrated in FIG. 7. FIG. 10B illustrates an example of another aspect from that of FIG. 10A. FIGS. 10A and 10B each illustrate the connection aspect between the coil end portion 231 as well as the coil end portion 232 and the busbar 31. However, a connection aspect between the coil end portion 231 as well as the coil end portion 232 and the busbar 32 or the busbar 33 is also the same as that in the case of the busbar 31.

In the aspect illustrated in FIG. 10A and FIG. 7, the coil end portion 231 and the coil end portion 232 are bent in the width direction of the second portion 3112 of the connection terminal 311.

In the aspect of FIG. 10A, the second portion 3112 is provided with one tongue portion 3114 and first and second tongue portions 3115, as illustrated in FIG. 10A and FIG. 9. The tongue portion 3114 is arranged at the center in the width direction of the second portion 3112, and the first and second tongue portions 3115 are each arranged at the end in the width direction of the second portion 3112. The tongue portion 3114 and the tongue portion 3115 adjacent to each other are separated by the recess (also referred to interchangeably herein as a "notch") 3113.

A first tongue portion 3115 is bent to cover the outer circumference of the coil end portion 231 by making use of this bent structure. In this state, the first tongue portion 3115 and the coil end portion 231 are fixed by fusing, soldering, laser welding, or the like. Thus, the coil end portion 231 and the connection terminal 311 are joined to each other.

Further, the second tongue portion 3115 is bent to cover the outer circumference of the coil end portion 232 by making use of this bent structure. In this state, the second tongue portion 3115 and the coil end portion 232 are fixed by fusing, soldering, laser welding, or the like. Thus, the coil end portion 232 and the connection terminal 311 are joined to each other.

In the aspect of FIG. 10B, as illustrated in FIG. 10B, the coil end portion 231 and the coil end portion 232 are bent in the lengthwise direction of the second portion 3112 of the connection terminal 311 and toward the first portion 3111 side. In this state, the coil end portion 231 as well as the coil end portion 232 and the second portion 3112 are fixed by fusing, soldering, laser welding, or the like. Thus, the coil end portion 231 as well as the coil end portion 232 and the connection terminal 311 are joined to one another.

Figure 11:
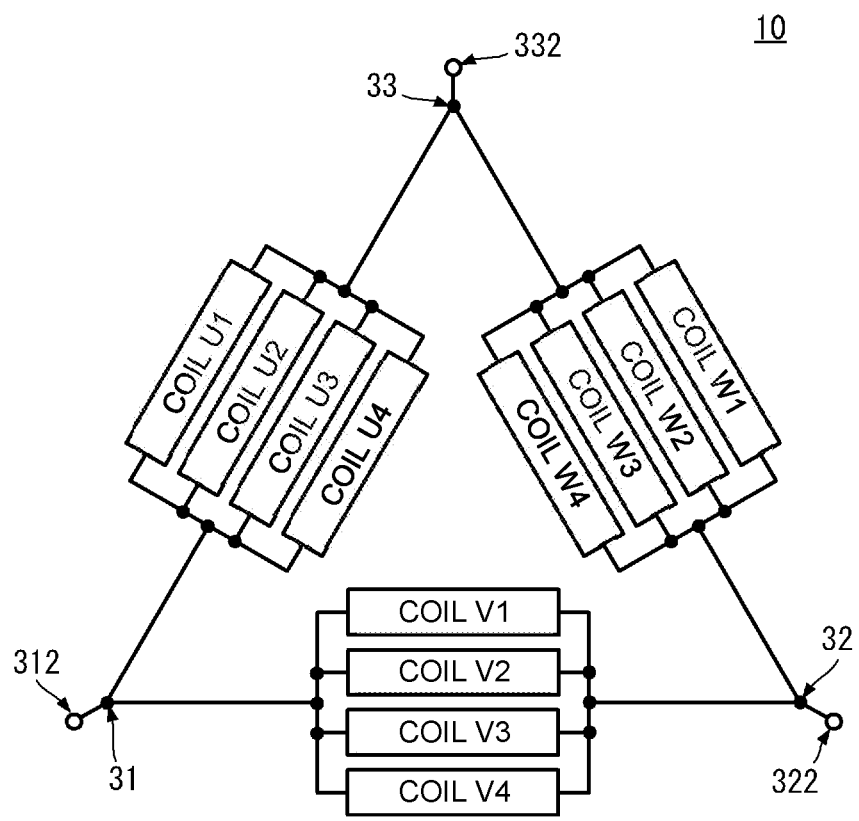
FIG. 11 is an equivalent circuit diagram of a motor in accordance with aspects of the present disclosure.

With the structure described above, the motor 10 having a circuit configuration illustrated in FIG. 11 may be achieved. FIG. 11 is an equivalent circuit diagram of the motor according to an aspect of the disclosure.

As illustrated in FIG. 11, the motor 10 includes a U-phase coil, a V-phase coil, and a W-phase coil. The U-phase coil has a circuit configuration in which a coil U1, a coil U2, a coil U3, and a coil U4 are connected in parallel. The V-phase coil has a circuit configuration in which a coil V1, a coil V2, a coil V3, and a coil V4 are connected in parallel. The W-phase coil has a circuit configuration in which a coil W1, a coil W2, a coil W3, and a coil W4 are connected in parallel.

One end of the U-phase coil is connected to one end of the V-phase coil. Another end of the V-phase coil is connected to one end of the W-phase coil. Another end of the W-phase coil is connected to the other end of the U-phase coil. For example, the U-phase coil, the V-phase coil, and the W-phase coil are connected in the form of delta connection.

Each of the coils U1, U2, U3, U4, V1, V2, V3, V4, W1, W2, W3, and W4 may be implemented by the stator member 20 described above. The connection portion connecting the U-phase coil and the V-phase coil may be implemented by, for example, the busbar 31 described above. The connection portion connecting the V-phase coil and the W-phase coil may be implemented by, for example, the busbar 32 described above. The connection portion connecting the W-phase coil and the U-phase coil may be implemented by, for example, the busbar 33 described above. The three output portions of the delta connection may be implemented by the output terminal 312 of the busbar 31, the output terminal 322 of the busbar 32, and the output terminal 332 of the busbar 33.

In the above configuration, the connection terminal 311 of the busbar 31, the connection terminal 321 of the busbar 32, and the connection terminal 331 of the busbar 33 are bent toward the side of the plurality of stator members 20 in the axial direction, as described above. Further, the second portion 3112 of the connection terminal 311 of the busbar 31, the second portion of the connection terminal 321 of the busbar 32, and the second portion of the connection terminal 331 of the busbar 33 overlap the insulators 22 of the plurality of stator members 20 in the axial direction. In one aspect of the disclosure, the second portions of the connection terminal 311 of the busbar 31, the connection terminal 321 of the busbar 32, and the connection terminal 331 of the busbar 33 overlap with the insulators 22 of the plurality of stator members 20 when the motor 10 is viewed from the side (viewed from a direction orthogonal to the axial direction). At these second portions, the connection terminals are connected to the coil end portions 231 and the coil end portions 232 of the stator members 20.

Accordingly, the size of a portion in the axial direction of the motor 10 including the busbar member 30 and the plurality of stator members 20, is the sum of the thickness of the laminated portion of the base portion 310 of the busbar 31, the base portion 320 of the busbar 32, the base portion 330 of the busbar 33, and the plurality of insulating layers 34 of the busbar member 30, and the size in the axial direction of the stator member 20. In one aspect of the disclosure, the size of the portion including the busbar member 30 and the plurality of stator members 20 in the axial direction of the motor 10 is not affected by the sizes of the connection terminal 311, the connection terminal 321, and the connection terminal 331. Therefore, the shape of the portion including the busbar member 30 and the plurality of stator members 20 may be reduced. Thus, it is possible to reduce the size of the motor 10 without lowering the output thereof.

As illustrated in FIGS. 1, 7, and 8, each of the second portions of the connection terminal 311, the connection terminal 321, and the connection terminal 331 is disposed on the center axis side relative to the outer end surface 214 of the stator core 21. With this, the dimension in the direction orthogonal to the axis is not increased. Accordingly, it is also possible to reduce the shape in the direction orthogonal to the axis of the motor 10 while maintaining the output thereof.

As an example, as illustrated in FIG. 9, each of the second portions of the connection terminal 311, the connection terminal 3112, and the connection terminal 3114 are in contact with the outer end surface 224 of the outer member 221 (not labeled) of the insulator 22 (not labeled). These contact portions may be used for positioning when the busbar member 30 is arranged with respect to the plurality of stator members 20. This makes it easy to assemble the motor 10.

FIG. 12A, FIG. 12B, FIG. 12C, FIG. 13A, and FIG. 13B are perspective views each illustrating another aspect of a connection terminal. In FIG. 12A, FIG. 12B, FIG. 12C, FIG. 13A, and FIG. 13B, the connection terminal 311 of the busbar 31 is taken as an example and described; the same may apply to the configurations of the connection terminal 321 of the busbar 32 and the connection terminal 331 of the busbar 33.

Figure 12A:
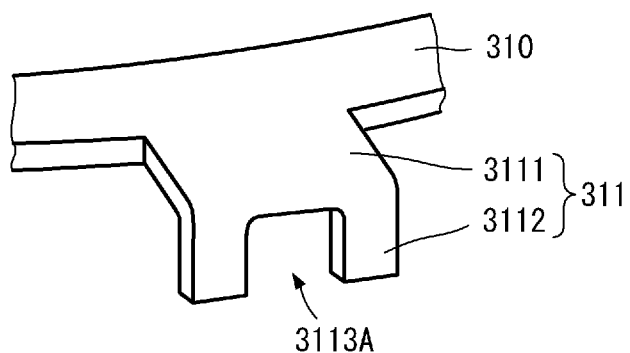
FIG. 12A is a perspective view illustrating another aspect of a connection terminal motor in accordance with aspects of the present disclosure.

A recess 3113A is formed in the second portion 3112 of the connection terminal 311 illustrated in FIG. 12A. The width of the recess 3113A is larger than the diameter of the coil end portion 231 and the diameter of the coil end portion 232, and is approximately two to four times the diameter of the coil end portion 231 and the coil end portion 232, for example.

Figure 12B:
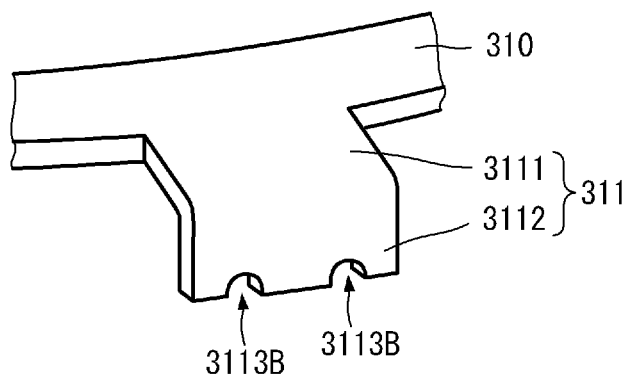
FIG. 12B is a perspective view illustrating another aspect of a connection terminal motor in accordance with aspects of the present disclosure.

Two recesses 3113B are formed in the second portion 3112 of the connection terminal 311 illustrated in FIG. 12B. The two recesses 3113B are different only in depth from the two recesses 3113 described above, and other constituent elements thereof are the same. The depth of the recess 3113B is smaller than the diameter of the coil end portion 231 and the diameter of the coil end portion 232, and is approximately equal to the radius of the coil end portion 231 and the radius of the coil end portion 232, for example.

Figure 12C:
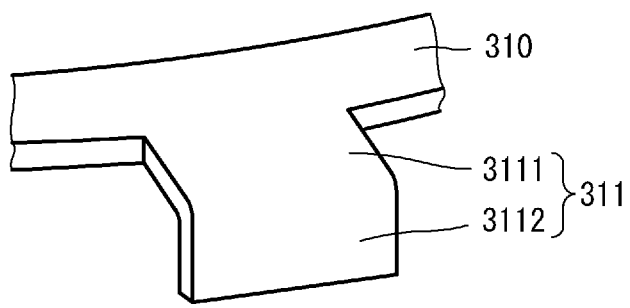
FIG. 12C is a perspective view illustrating another aspect of a connection terminal motor in accordance with aspects of the present disclosure.

No recess is formed in the second portion 3112 of the connection terminal 311 illustrated in FIG. 12C. That is, the second portion 3112 is a flat plate without a recess.

Figure 13A:
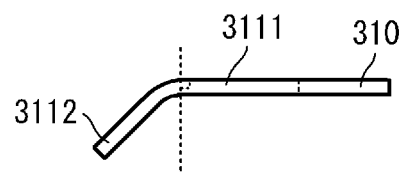
FIG. 13A is a perspective view illustrating another aspect of a connection terminal in accordance with aspects of the present disclosure.

In the connection terminal 311 illustrated in FIG. 13A, the second portion 3112 is not orthogonal to the first portion 3111. For example, as illustrated in FIG. 13A, an angle formed between a surface on the insulator side of the second portion 3112 and the insulator of the first portion 3111 is an obtuse angle of larger than about 90° and smaller than about 180°.

Figure 13B:
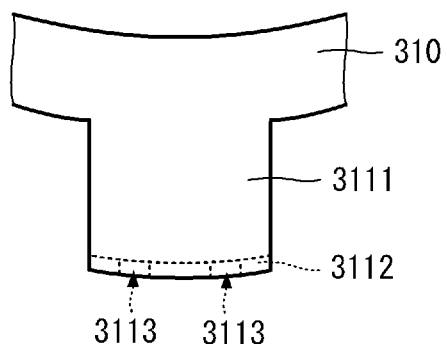
FIG. 13B is a perspective view illustrating another aspect of a connection terminal in accordance with aspects of the present disclosure.

In the connection terminal 311 illustrated in FIG. 13B, the second portion 3112 is curved. More specifically, in the second portion 3112, the distance to the base portion 310 is the same at any position in the width direction. With this configuration, when the outer end surface 224 of the outer member 221 of the insulator 22 is curved, the second portion 3112 and the outer end surface 224 may entirely come into contact with each other.

For example, referring to FIGS. 3A and 3B, the structure of the outer member 221 and the outer end surface 224 of the insulator 22 may be as follows (depending on the structure of the second portion of the connection terminal of the busbar).

When the connection terminal of the busbar is a flat plate and a recess is present therein, a surface of the outer end surface 224 with which the connection terminal makes contact is flattened. That is, the outer end surface 224 is shaved inward at the adjacent end portions of the adjacent stator members 20. At this time, the outer end surface 224 is shaved to also include a portion through which the coil end portion 231 and the coil end portion 232 are drawn. The shaved portions of the adjacent insulators are flush with each other.

With such a configuration, the shape of the insulator is reduced. Further, at the portion through which the coil end portion 231 and the coil end portion 232 are drawn, the connection terminal and the outer end surface 224 become close to each other in distance or make contact with each other. Therefore, the work of joining between the coil end portion 231 and the coil end portion 232 is facilitated. Moreover, the certainty of joining between the coil end portion 231 as well as the coil end portion 232 and the connection terminal is improved, so that the reliability of the connection portion between the coil end portion 231 as well as the coil end portion 232 and the connection portion is improved.

When the connection terminal of the busbar is a flat plate and a recess is present therein, a groove that is recessed from the surface 226 is formed at a place in the outer member 221 through which the coil end portion 231 and the coil end portion 232 are drawn. The size of the groove is set such that the coil end portion 231 as well as the coil end portion 232 and the connection terminal are fitted into the groove. In aspect of the disclosure, the dimension of the groove along the width direction of the outer member 221 is substantially equal to the width of the connection terminal, and is equal to or larger than the width of the connection terminal. The dimension of the groove along the thickness direction (the direction from the inner side to the outer side) of the outer member 221 approximately equals twice the thickness of the connection terminal and the diameter of the coil end portion 231 as well as the coil end portion 232, and is equal to or larger than that.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A transducer for converting between electrical energy and mechanical energy, comprising:
   a stator comprising a coil winding; and
   a busbar comprising a base portion having an annular shape and a connection terminal extending from an outer circumference of the base portion in a direction towards the stator relative to the base portion;
   wherein the connection terminal is connected to a first end of the coil winding, and the busbar and the stator are aligned in an axial direction of the stator,
   wherein the connection terminal comprises a first notch that extends inward from an end of the connection terminal towards an opposite side connected at the base portion, and the first end of the coil winding is connected to the connection terminal via the first notch,
   wherein the connection terminal further comprises a first tongue portion formed by the first notch, and the first end of the coil winding is in contact with and connected to the connection terminal based on the first tongue portion partially surrounding the first end of the coil winding, and
   wherein the connection terminal further comprises a second tongue portion formed by a second notch, and a second end of the coil winding is in contact with and connected to the connection terminal based on the second tongue portion partially surrounding the second end of the coil winding.

2. The transducer of claim 1, wherein the stator further comprises a stator core and an insulator, and wherein the coil winding is configured to be wound around the insulator and the stator core.

3. The transducer of claim 2, wherein the connection terminal is adjacent to or in contact with an outer surface of the insulator.

4. The transducer of claim 1, wherein the first tongue portion is configured in a U-shape to partially surround the first end of the coil winding.

5. The transducer of claim 1, wherein the second tongue portion is configured in a U-shape to partially surround the second end of the coil winding.

6. The transducer of claim 5, wherein the connection terminal is adjacent to or in contact with an outer surface of an insulator.

7. The transducer of claim 1, wherein the busbar is formed in a plate shape.

8. A transducer for converting between electrical energy and mechanical energy, comprising:
   a stator comprising a coil winding; and
   a busbar comprising a base portion having an annular shape and a connection terminal extending from an outer circumference of the base portion in a direction towards the stator relative to the base portion,
   wherein the connection terminal is connected to a first end of the coil winding, and the busbar and the stator are aligned in an axial direction of the stator,
   wherein the connection terminal comprises a first notch that extends inward from an end of the connection terminal towards an opposite side connected at the base portion, and the first end of the coil winding is connected to the connection terminal via the first notch, and
   wherein the connection terminal further comprises a second notch that extends inward from an end of the connection terminal towards an opposite side connected at the base portion and parallel to the first notch, and a second end of the coil winding is connected to the connection terminal via the second notch.

9. The transducer of claim 8, wherein the first end of the coil winding and the second end of the coil winding are angled upward in a direction away from the end of the connection terminal and in contact with the connection terminal.

10. The transducer of claim 8, wherein the stator further comprises a stator core and an insulator, and wherein the coil winding is configured to be wound around the insulator and the stator core.

11. The transducer of claim 10, wherein the connection terminal is adjacent to or in contact with an outer surface of the insulator.

12. The transducer of claim 8, wherein the busbar is formed in a plate shape.

13. A busbar of a transducer comprising:
    a base portion having an annular shape; and
    a connection terminal extending from an outer circumference of the base portion in a direction towards a stator of the transducer relative to the base portion;
    wherein the connection terminal is configured to accept a first end of a coil winding of the stator;
    wherein the connection terminal comprises a first notch that extends inward from an end of the connection terminal towards an opposite side connected at the base portion, and the first end of the coil winding is configured to be connected to the connection terminal via the first notch,
    wherein the connection terminal further comprises a first tongue portion formed by the first notch, and the first end of the coil winding is configured to be in contact with and connected to the connection terminal based on the first tongue portion partially surrounding the first end of the coil winding,
    wherein the connection terminal further comprises a second tongue portion formed by a second notch, and a second end of the coil winding is configured to be in contact with and connected to the connection terminal based on the second tongue portion partially surrounding the second end of the coil winding.

14. The busbar of claim 13, wherein the first tongue portion is configured in a U-shape to partially surround the first end of the coil winding.

15. The busbar of claim 13, wherein the busbar is formed in a plate shape.

16. A busbar of a transducer comprising:
a base portion having an annular shape; and
a connection terminal extending from an outer circumference of the base portion in a direction towards a stator of the transducer relative to the base portion;
wherein the connection terminal is configured to accept a first end of a coil winding of the stator,
wherein the connection terminal comprises a first notch that extends inward from an end of the connection terminal towards an opposite side connected at the base portion, and the first end of the coil winding is configured to be connected to the connection terminal via the first notch,
wherein the connection terminal further comprises a second notch that extends inward from an end of the connection terminal towards an opposite side connected at the base portion and parallel to the first notch, and
wherein a second end of the coil winding is configured to be connected to the connection terminal via the second notch.

17. The busbar of claim 16, wherein the busbar is formed in a plate shape.

\* \* \* \* \*